United States Patent [19]

Haill

[11] 4,296,483

[45] Oct. 20, 1981

[54] METHOD AND MEANS FOR MEASURING GEOPHONE PARAMETERS

[75] Inventor: Harry K. Haill, Houston, Tex.

[73] Assignee: Litton Resources Systems, Inc., Houston, Tex.

[21] Appl. No.: 164,622

[22] Filed: Jun. 30, 1980

[51] Int. Cl.³ ............................................. G01V 13/00
[52] U.S. Cl. ................................... 367/13; 73/1 DV
[58] Field of Search ....................... 367/13, 182, 20; 73/1 DV

[56] References Cited

U.S. PATENT DOCUMENTS

| | | | |
|---|---|---|---|
| 2,748,348 | 5/1956 | McCarter | 73/1 DV |
| 2,796,756 | 6/1957 | Yates et al. | 367/13 X |
| 3,959,770 | 5/1976 | Schaefer | 367/13 X |
| 4,043,175 | 8/1977 | Fredriksson et al. | 367/13 |
| 4,233,677 | 11/1980 | Brown et al. | 367/13 |

Primary Examiner—Richard A. Farley
Attorney, Agent, or Firm—William A. Knox

[57] ABSTRACT

A geophone testing apparatus includes a plurality of force detectors upon each of which is mounted a corresponding geophone. An electrical step function is applied to the active elements of the geophones to generate mechanical output transients. The mechanical output transients are detected by the force detectors which generate corresponding electrical signals. The signals are analyzed to determine the sensitivity, damping and natural frequency of each of the geophones under test. A multiplexer is provided so that all of the geophones may be tested at the same time.

8 Claims, 5 Drawing Figures

METHOD AND MEANS FOR MEASURING GEOPHONE PARAMETERS

BACKGROUND OF THE INVENTION

1. Technical Field of the Invention

This invention is concerned with a method and apparatus for measuring desired geophone parameters such as sensitivity, damping and natural frequency.

2. Discussion of Prior Art

A seismometer is a device for detecting and measuring mechanical vibratory motion. Essentially, a seismometer consists of a mass, suspended from a spring secured to a support. A sensing element measures the relative motion between the support and the stationary mass. Seismometers are used in earthquake studies, geophysical exploration for oil, for foundation studies in engineering work, for intruder detection, for monitoring the movements of vibrating machinery and for many other applications. The design parameters of a seismometer are tailored to fit the technology involved.

Various types of sensing elements are known. One common type consists of a spring from which is suspended a coil of wire, that constitutes the mass and moves relative to a magnetic field. In most instruments, the coil and the form upon which it is wound constitute the mass. Relative movement of the coil with respect to the magnetic field generates an electrical signal indicative of the amplitude and frequency of the mechanical vibration. The moving-coil element is widely used with seismometers, also known as geophones, that are used for geophysical exploration for oil. Other types of sensing elemets are based upon magnetostrictive or variable reluctance principles. The sensing elements have in common the ability to convert mechanical input motion into electrical output signals. Conversely, an electrical signal applied to the sensing element will induce a mechanical motion to that element.

For purposes of this disclosure, by way of example but not by way of restriction, moving-coil elements, as used in geophones, will be the subject of the ensuing discussion. A typical moving-coil geophone is disclosed in U.S. Pat. No. 4,159,464, assigned to the assignee of this invention. That patent is incorporated herein by reference as a showing of a typical geophone.

Geophones are manufactured to close tolerances. In the factory, they must be tested to assure uniformity of the output-signal characteristics. In the field, they must be tested to detect a change in parametric tolerances due to use and abuse.

Parameters of interest are sensitivity, damping, natural or resonant frequency, coil resistance and phase shift.

In one form of test, a geophone to be tested is mounted on a shaking table next to a standard geophone. The two geophones are excited at various frequencies and their outputs are compared. If the output signals match within predetermined limits, the geophone under test is accepted.

Another type of test may be conducted wherein a geophone is driven by a steady-state oscillatory electrical signal. The back EMF of the coil is compared with the driving signal and is expected to meet preset standards.

Both of the above tests are qualitative but not necessarily diagnostic of specific parameters.

A somewhat more analytical test involves applying a mechanical or electrical step function to the geophone being tested. A transient output signal, or signature, results from the step-function output. By use of equations well known in the art, the first four parameters listed above can be calculated. See for example, U.S. Pat. Nos. 4,043,175 and 4,015,202.

All of the above test procedures must be performed upon individual geophones, one at a time. Clearly such tests are slow and cumbersome for production testing in a factory as well as for field testing.

As is well known in geophysical exploration, for purposes of signal enhancement, a plurality of geophones may be employed in an array. The geophones of the array are permanently electrically wired together as a single string. The individual output signals of the repsective geophones, being electrically combined, produce a single composite output signal. A diagnostic test of the individual geophones of such an array is simply not possible using prior-art methods, without violating the electrical integrity of the array as a whole.

SUMMARY OF THE INVENTION

It is an object of this invention to provide a method and apparatus for rapidly determining selected parameters of each one of a plurality of geophones, regardless of whether the geophones are independent of each other or are electrically connected together in an array.

In a preferred embodiment of this invention, a geophone or seismometer is mounted on a force detector. An electrical step function, such as a square wave, is applied to the active sensing element such as the moving coil of the geophone. The step function momentarily disturbs the sensing element which generates a characteristic transient mechanical output or signature that is detected by the force detector. The output signal of the force detector is analyzed to determine desired parameters of the geophone.

In accordance with an aspect of this invention, a plurality of force detectors are provided for detecting the transient signatures of a plurality of geophones. An electrical step function is applied simultaneously to all of the geophones. The outputs of the force detectors are multiplexed by a multiplexer to a single-channel output. The multiplexer output is sampled, digitized and transmitted to a computer for determination of the desired parameters attributable to each one of the respective geophones.

In another aspect of this invention, the known sensitivity of the force detectors is applied as a coefficient to the output signals of the force detectors to determine the absolute sensitivity of the geophones under test.

In yet another aspect of this invention, a square-wave signal train is applied to a geophone to generate a plurality of transient signatures at the output of a force detector. The plurality of transient signatures are averaged before analysis to provide an average value for each determined parameter.

DETAILED DESCRIPTION OF THE PREFERRED EMBODIMENT

Let an electrical step function be applied as an input signal to the active sensing element of a damped seismometer such as a moving-coil geophone. The inertial mass represented by the coil is impulsively displaced to produce a damped mechanical transient force. If the geophone is mounted on a force detector or sensor, the applied mechanical transient force will cause the force detector to generate an electrical output signal such as the transient signature 10 of FIG. 1. From that signature, the natural frequency, sensitivity, and damping of the geophone may be calculated from suitable well-known equations.

Figure 2:
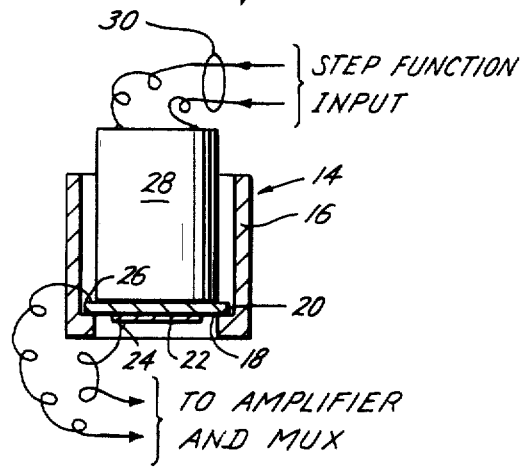
FIG. 2 shows a geophone mounted on a force transducer serving as a geophone tester.
Figure 3:
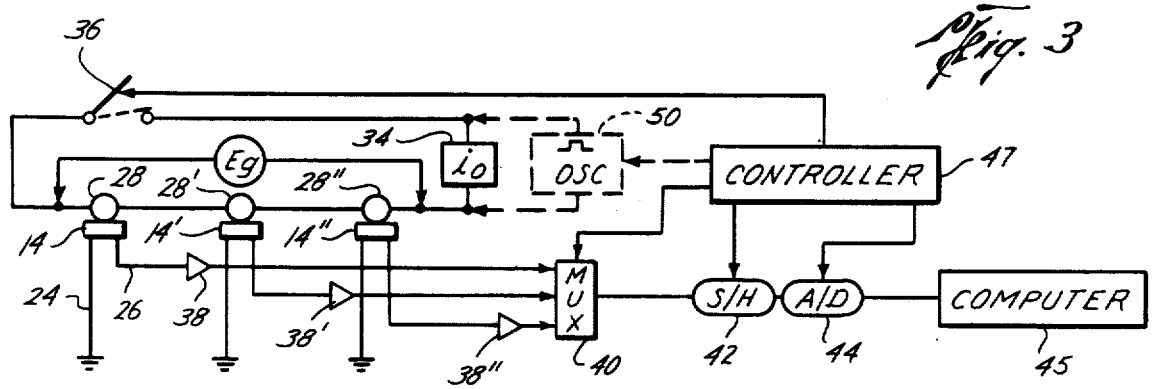
FIG. 3 is a schematic circuit of a plurality of geophone testers multiplexed into a common signal processor.

Referring now to FIG. 2, there is shown the preferred form of a force detector 14 that forms a part of the overall geophone tester system shown schematically in greater detail in FIG. 3. Force detector 14 includes an open-topped, hollow shell 16. A thin, flexible diaphragm 18, preferably metallic, is secured to a shoulder 20 at the bottom of shell 16. A piezoelectric crystal 22 is conductively cemented to the bottom of diaphragm 18. The bottom of crystal 22 is silvered so that a conductor lead 24 can be soldered thereto. A second conductor 26 is soldered to diaphragm 18 as the other signal output lead for crystal 22. Leads 24 and 26 are brought outside shell 16 through suitable holes in the wall thereof. A geophone 28 may be inserted into shell 16 resting on diaphragm 18. Geophone 28 of course, has leads 30 which are internally connected to the moving coil, not shown. An electrical transient applied to geophone 28 generates a mechanical output force that is transmitted to crystal 22 through diaphragm 18 to produce an output signal proportional to the applied force.

It is important that the natural frequency of the force detector 14, when loaded with the mass of geophone 28 plus any internal supporting structure for the geophone, be at least an order of magnitude above the natural frequency of the geophone under test. That requirement is necessary to avoid distorting the output signal of the force detector relative to the force applied to it by the geophone. Thus, if the natural frequency of the geophone is on the order of 10 Hz, the natural frequency of the force detector must be at least 100 Hz or more. Force detector 14 must be accurately calibrated because the output signal of force detector 14 is a function of the product of the geophone sensitivity and the force-detector sensitivity. Accordingly, the force-detector sensitivity must be applied as a coefficient to the output signal to reduce the signal to that due to the geophone alone, as will be discussed below.

Referring now to FIG. 3 there is shown schematically a plurality of force detectors 14, 14', 14" upon which are resting corresponding geophones 28, 28', 28". Three such units are shown, but many more are used in practice. Geophones 28, 28', 28" are connected inseries with a constant current source 34. A normally-open switch 36 is connected in series with the geophones and voltage source. A mechanical switch is shown, but an electronic switch is preferred. In operation, to conduct a test, switch 36 momentarily closed to apply a current $i_o$ to the moving coils of geophones 28, 28', 28". The applied current is sufficient to displace the moving-coil inertia elements a desired distance. When the current is released at time $t_o$, the inertial elements seek to return to their rest position. In so doing, they generate a reactive mechanical transient force that is sufficient to cause the force detectors to develop a desired voltage $E_{f1}$, at the force detector outputs. There will, of course, be a voltage $E_g$ developed across geophones 28-28" in proportion to the applied current $i_o$ and the total resistance across the circuit. The desired voltage $E_{f1}$ is on the order of 200 millivolts and the exciting current will be in the range of 0.2 to 5.0 milliamperes.

Upon command at time $t_o$ (FIG. 1) the switch is opened, releasing the respective moving coils. The mechanical force generated by movement of the coils generates a signal in force detectors 14, 14', 14". The signals from the detectors are amplified by amplifiers 38, 38', 38" and are then transmitted to multiplexer 40. At multiplexer 40, the signals are multiplexed into a common output and are sampled in sample-and-hold circuit 42. The sampled signals are digitized in analog-to-digital converter 44. From experience, it has been found that about 50 samples per transient cycle are adequate. Accordingly, for a 10 Hz geophone, the sample rate is about two milliseconds. The digitized signals are then processed in a suitable data processor such as a digital computer 45.

Operation of switch 36, multiplexer 40, sample-and-hold circuit 42 and A/D converter 44 are synchronized by a controller 47 of conventional design. Controller 47 may be sequenced by the computer 45 or computer 45 itself may be programmed to perform the control functions without a separate controller.

Figure 4:
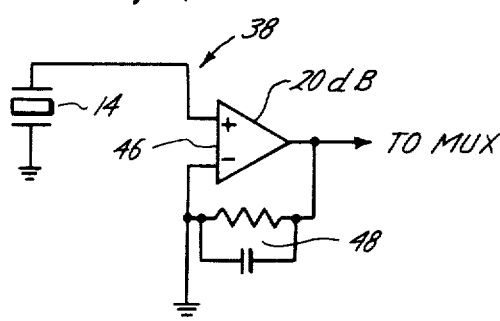
FIG. 4 is a detail of a typical force-detector signal amplifier and low pass filter.

The details of a typical buffer amplifier 38 are shown in FIG. 4. Output from a force detector such as 14 is fed to the non-inverting input of an operational amplifier 46. An RC filter 48 controls the gain of the amplifier and also acts as a low pass filter to minimize high frequency noise. The gain of the amplifier may be unity; preferably it may be 20 dB. The amplifier circuit is conventional and per se forms no part of this invention.

Returning now to FIG. 1, geophone sensitivity, G, damping, $b_o$ and natural frequency, fn, are calculated by computer 45 from the following well known equations:

$$G = E_{f1}/(S \times i_o \times 10^7) \text{ V/cm/sec,}$$

where $E_{f1}$ is the maximum amplitude of transient 10, S is the known sensitivity of force detector 14 and $i_o$ is the driving current. The coefficient $10^7$ is a unit-conversion factor. If the gain of amplifier 38 is other than unity, then a coefficient $k^{-1}$ must be applied where k is the amplifier gain.

Figure 1:
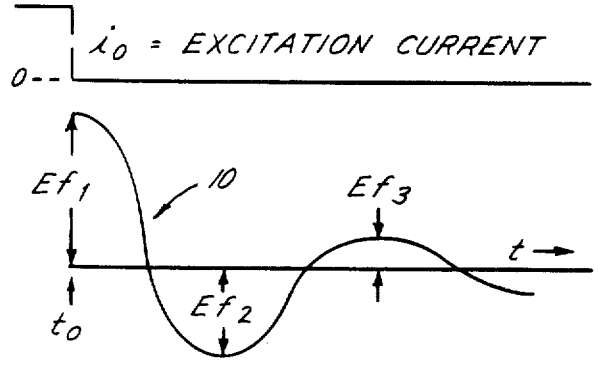
FIG. 1 is the output transient-response signature resulting from excitation of a geophones by a step-function input.

Damping $b_o$ is found from $$b_o = ((\pi/ln(E_{f2}E_{f3}))^2 + 1)^{-\frac{1}{2}},$$

where $E_{f2}$ and $E_{f3}$ are the amplitudes of the second and third maxima of FIG. 1. The amplitude ratio between the first and second maxima could be used in the above equation, but for practical reasons, the second and third maxima are preferred.

Natural frequency f is calculated from $$f_n = (T_x(1-b_o^2)^{\frac{1}{2}})^{-1} Hz,$$

where $T_x$ is the time difference between the first and third axis crossings, the reciprocal of which is the damped frequency.

The phase shift of the geophone is a function of natural frequency and damping. So long as those two values lie within a selected tolerance, then so also will the phase shift be within tolerance.

If a single geophone is under test, the effective coil resistance can be computed from $$R = E_g/i_o.$$

If a plurality of series-connected geophones are being tested then of course, R is the total resistance of the string. Dividing R by the number of geophones in the string, yields the average resistance of each coil. Statistically, the average individual resistance will closely match the true resistance of the respective coils. A gross difference between the specified resistance and the observed average resistance is indicative of a faulty geophone in the string. The faulty geophone can usually be identified because one or more of the computed parameters will be out of tolerance.

Figure 5:
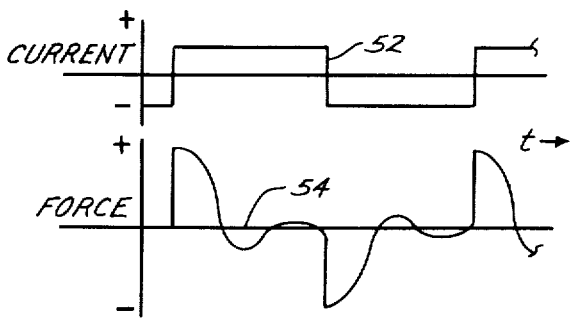
FIG. 5 is the transient-response signature-train of a geophone due to a square-wave driving signal.

In FIG. 3, a switch was used to apply a step function to the geophones. In an alternate embodiment, a square wave train is applied. Thus, in place of constant current source 34, a square wave oscillator 50 may be used as shown by the dashed lines. The frequency of the square waves is not critical but the period of one half-cycle must be long enough to allow the amplitude of a preceeding transient to settle to less than 1% of the maximum amplitude, $E_{f1}$ before a new impulse is applied. See FIG. 5 where the square wave train is represented by 52 and the series of transients are plotted along axis 54. In operation, several square waves are applied to the same string of geophones. Each transient is separately analyzed by computer 45 and the results are averaged.

I have disclosed a geophone test apparatus suitable for the simultaneous testing of a plurality of geophones, well adapted to mass-production testing either in a factory or in the field maintenance shop. The apparatus is suitable for use with any type of transducer that produces an electrical output in response to a mechanical input and that produces a mechanical output in response to an electrical input. My invention has been disclosed in terms of a moving-coil geophone but it is not restricted thereto.

The invention has been described with particular reference to a step-function input. Other periodic functions such as a sine wave may be equally well employed without departing from the scope and spirit of this invention which is limited only by the appended claims.

I claim as my invention:

1. A device for substantially simultaneously testing the respective active elements of a plurality of electrically interconnected geophones that generate a signal output in response to a mechanical input and that will generate a mechanical output in response to a signal input, comprising:
    means for applying a signal input in series to said active elements;
    means for detecting the resultant mechanical force outputs of said geophones; and
    means for sequentially determining selected characteristics of the individual active elements from the detected mechanical force outputs.

2. The testing device as defined in claim 1 wherein:
    the signal input is a desired constant current electrical function; and
    the detecting means are force detectors contacting said geophones for converting the mechanical force outputs of the geophones to electrical signals.

3. A testing apparatus for measuring selected parameters of individual ones of a plurality of geophones, each having an active element, comprising:
    means for electrically exciting all of the active elements of said geophones to generate mechanical output forces;
    means, contacting each geophone, for converting the mechanical output forces to electrical signals; and
    means for sequentially analyzing the electrical signals to determine said selected parameters of the individual geophones.

4. The testing apparatus as defined by claim 3 wherein the exciting means is a square wave oscillator for applying an electrical step function to said active elements.

5. The testing apparatus as defined by claim 3 wherein the converting means are force detectors.

6. A method for determining selected parameters of the active elements of individual ones of a plurality of geophones comprising the steps of:
    applying a constant-current electrical step function in series to all of the active elements to generate reactive-force outputs;
    detecting the reactive-force outputs with a corresponding plurality of external force detectors whose output signals are proportional to said reactive forces;
    sequentially analyzing the force-detector output signals to determine the selected parameters attributable to the active elements of each of the geophones.

7. An apparatus for simultaneously testing a plurality of series-connected geophones, each having an active element, the geophones being of the type that produce an electrical output in response to a mechanical input and that produce a mechanical force output in response to an electrical input, comprising:
    means for applying a constant-current step-function excitation current to said series-connected geophones.
    means, contacting each said geophone for converting the respective mechanical force outputs, due to said applied step function, to electrical signals;
    means for multiplexing said electrical signals into a common output channel; and
    means coupled to said common output channel for determining selected parameters of the individual geophones.

8. An apparatus for measuring, substantially simultaneously, selected parameters of the individual ones of a plurality of geophones, each having an active element, comprising:
    a constant-current source of electrical power for applying a step function to the active elements of said plurality of geophones in in series, to cause said geophones to generate reactive forces in response to said step function;
    a plurality of force detectors that provide an output signal, proportional to an applied force, mechanically contacting the respective geophones for detecting reactive forces generated by said geophones; and
    a signal processor, sequentially couplable to the respective force detectors for receiving the output signals therefrom to determine the selected parameters of each said geophone.

* * * * *